United States Patent
Zhang et al.

(10) Patent No.: US 12,026,804 B2
(45) Date of Patent: Jul. 2, 2024

(54) METHOD FOR DETERMINING COLLISION RANGE AND RELATED APPARATUS

(71) Applicant: TENCENT TECHNOLOGY (SHENZHEN) COMPANY LIMITED, Shenzhen (CN)

(72) Inventors: Xiang Zhang, Shenzhen (CN); Yi Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 145 days.

(21) Appl. No.: 17/749,120

(22) Filed: May 19, 2022

(65) Prior Publication Data
US 2022/0277495 A1   Sep. 1, 2022

Related U.S. Application Data

(63) Continuation of application No. PCT/CN2021/088566, filed on Apr. 21, 2021.

(30) Foreign Application Priority Data

May 20, 2020 (CN) .......................... 202010429935.7

(51) Int. Cl.
*G06T 11/00* (2006.01)
*A63F 13/56* (2014.01)
(Continued)

(52) U.S. Cl.
CPC .............. *G06T 11/00* (2013.01); *A63F 13/56* (2014.09); *G06T 7/60* (2013.01); *G06T 17/00* (2013.01);
(Continued)

(58) Field of Classification Search
None
See application file for complete search history.

(56) References Cited

U.S. PATENT DOCUMENTS

2006/0022974 A1* 2/2006 Yamamoto ............ A63F 13/837
345/419
2015/0050997 A1* 2/2015 Suzman .................. A63F 13/55
463/31
(Continued)

FOREIGN PATENT DOCUMENTS

CN    105590339 A    5/2016
CN    107066648 A    8/2017
(Continued)

OTHER PUBLICATIONS

The World Intellectual Property Organization (WIPO) International Search Report for PCT/CN2021/088566 dated Jul. 29, 2021 5 Pages (including translation).

*Primary Examiner* — Jason T Yen
(74) *Attorney, Agent, or Firm* — ANOVA LAW GROUP, PLLC (57) ABSTRACT

A method for determining a collision range includes: determining a grid plane corresponding to a model, the grid plane including a plurality of grid regions; projecting the model to the grid plane and obtaining height information of the model with respect to the grid plane, the height information of the model including grid height information corresponding to a grid region that identifies a height of a sub-model in the model with respect to the grid plane, and the sub-model being a portion of the model in a projection space of the grid region; and obtaining a collision range of the model according to the grid plane and the height information.

20 Claims, 7 Drawing Sheets

(51) Int. Cl.
*G06T 7/60* (2017.01)
*G06T 17/00* (2006.01)
(52) U.S. Cl.
CPC .................. *G06T 2207/20068* (2013.01); *G06T 2210/21* (2013.01); *G06T 2210/32* (2013.01)

(56) References Cited

U.S. PATENT DOCUMENTS

2019/0340432 A1* 11/2019 Mousavian .............. G06T 7/50
2019/0385355 A1* 12/2019 Xu ...................... G06F 16/2255
2021/0173471 A1* 6/2021 Johnson ................ G06T 19/006

FOREIGN PATENT DOCUMENTS

| CN | 109701273 A | 5/2019 |
| CN | 111612921 A | 9/2020 |

* cited by examiner

METHOD FOR DETERMINING COLLISION RANGE AND RELATED APPARATUS

CROSS-REFERENCES TO RELATED APPLICATIONS

This application is a continuation application of PCT Patent Application No. PCT/CN2021/088566, entitled "COLLISION RANGE DETERMINATION METHOD AND RELATED DEVICE" and filed on Apr. 21, 2021, which claims priority to Chinese Patent Application No. 202010429935.7, filed to the China Patent Office on May 20, 2020, entitled "Method for Determining Collision Range and Related Apparatus", the entire contents of both of which are incorporated herein by reference.

FIELD OF THE TECHNOLOGY

The present disclosure relates to the field of data processing, and in particular, to a technology for determining a collision range.

BACKGROUND OF THE DISCLOSURE

In a three-dimensional scene, collision ranges of models corresponding to various objects in the scene need to be determined. Thus, when performing object control and interaction in the three-dimensional scene, a proper collision effect can be achieved according to collision ranges between models, and the sense of reality can be improved.

In the related art of calculating collision ranges, a collision range of a model is determined by traversing all components of the model and associating divided spaces after spatial division of a three-dimensional space.

As a model of an object is more complex, the number of components of the model, e.g., triangular patches, will be larger, and time consumed for the traversal will be longer, thereby seriously affecting determination efficiency.

SUMMARY

In order to solve the above-mentioned technical problem, the present disclosure provides a method for determining a collision range, which can avoid traversing all patches of a three-dimensional model by combining height information and a grid plane, thereby saving a determination time and improving determination efficiency.

The following technical solutions are disclosed in the embodiments of the present disclosure:

In a first aspect, embodiments of the present disclosure provide a method for determining a collision range. The method includes: determining a grid plane corresponding to a model, the grid plane including a plurality of grid regions; projecting the model to the grid plane and obtaining height information of the model with respect to the grid plane, the height information of the model including grid height information corresponding to a grid region that identifies a height of a sub-model in the model with respect to the grid plane, and the sub-model being a portion of the model in a projection space of the grid region; and obtaining a collision range of the model according to the grid plane and the height information.

In a second aspect, embodiments of the present disclosure provide an apparatus for determining a collision range. The apparatus includes a first determination unit, a projection unit, and a second determination unit. The first determination unit is configured to determine a grid plane corresponding to a model. The grid plane includes a plurality of grid regions. The projection unit is configured to project the model to the grid plane so as to obtain height information of the model with respect to the grid plane. The height information of the model includes grid height information corresponding to a grid region that identifies a height of a sub-model in the model with respect to the grid plane, and the sub-model is a portion of the model in a projection space of the grid region. The second determination unit is configured to obtain a collision range of the model according to the grid plane and the height information.

In a third aspect, embodiments of the present disclosure provide a device for determining a collision range. The device includes a processor and a memory. The memory is configured to store a program code and transmit the program code to the processor. The processor is configured to perform the method for determining a collision range described in the first aspect according to instructions in the program code.

In a fourth aspect, embodiments of the present disclosure provide a non-transitory computer-readable storage medium for storing a computer program for performing the method for determining a collision range described in the first aspect.

It can be seen from the above-mentioned technical solution that a grid plane including a plurality of grid regions may be determined according to a model. The model is projected to the grid plane so as to obtain height information of the model with respect to the grid plane. That is to say, when a three-dimensional model is transformed to a two-dimensional model by projection, heights of portions of the model in a projection space of each grid region may be acquired in the projection process. A collision range of the model may be obtained according to the grid plane and the height information without traversing all components in the model, thereby reducing the impact of a complex model on determination of the collision range and improving the efficiency of determining the collision range.

BRIEF DESCRIPTION OF THE DRAWINGS

To describe the technical solutions in the embodiments of the present disclosure or related technology more clearly, the following briefly describes the accompanying drawings required for describing the embodiments or related technology. Apparently, the accompanying drawings in the following description show only some embodiments of the present disclosure, and a person of ordinary skill in the art may derive other drawings from the accompanying drawings without creative efforts.

DESCRIPTION OF EMBODIMENTS

The following describes the embodiments of the present disclosure with reference to the accompanying drawings.

With the continuous development of a computer technology, three-dimensional models have been widely used in more and more fields, such as three-dimensional games and real scene simulation. In order to make the three-dimensional models more real, relevant personnel may determine collision ranges of the three-dimensional models, so that a real collision situation may be accurately simulated when a collision occurs between the three-dimensional models.

The three-dimensional model is mainly composed of individual patches. In the related art, in order to determine the collision range of a three-dimensional model, each patch of the three-dimensional model needs to be covered by a three-dimensional grid, a three-dimensional position of each patch in the grid is then traversed, and a collision range of the three-dimensional model is finally obtained by combining the positions of all the patches. Since it is necessary to traverse each patch of the three-dimensional model on a three-dimensional level, this method is time-consuming and inefficient in determination.

In order to solve the above-mentioned technical problem, the present disclosure provides a method for determining a collision range, which can avoid traversing all patches of a three-dimensional model, thereby saving a determination time and improving determination efficiency.

It is to be understood that the method may be applied to a processing device that is capable of performing model analysis, such as a terminal device or a server having a model analysis function. The method may be independently performed by a terminal device or a server, and may also be applied to a network scene in which the terminal device communicates with the server, and is performed by the cooperation of the terminal device and the server. The terminal device may be a computer, a personal digital assistant (PDA), a tablet computer, etc. The server may be understood as an application server and may also be a Web server. When actually deployed, the server may be an independent server or a cluster server. Meanwhile, a hardware environment in which this technology has been implemented includes: an ARM architecture processor and an X86 architecture processor. A software environment in which this technology has been implemented includes: an Android platform, Windows XP and next-generations operating systems, or a Linux operating system.

In order to facilitate an understanding of the technical solution of the present disclosure, a method for determining a collision range provided by the embodiments of the present disclosure will be described below in conjunction with practical application scenes.

Figure 1:
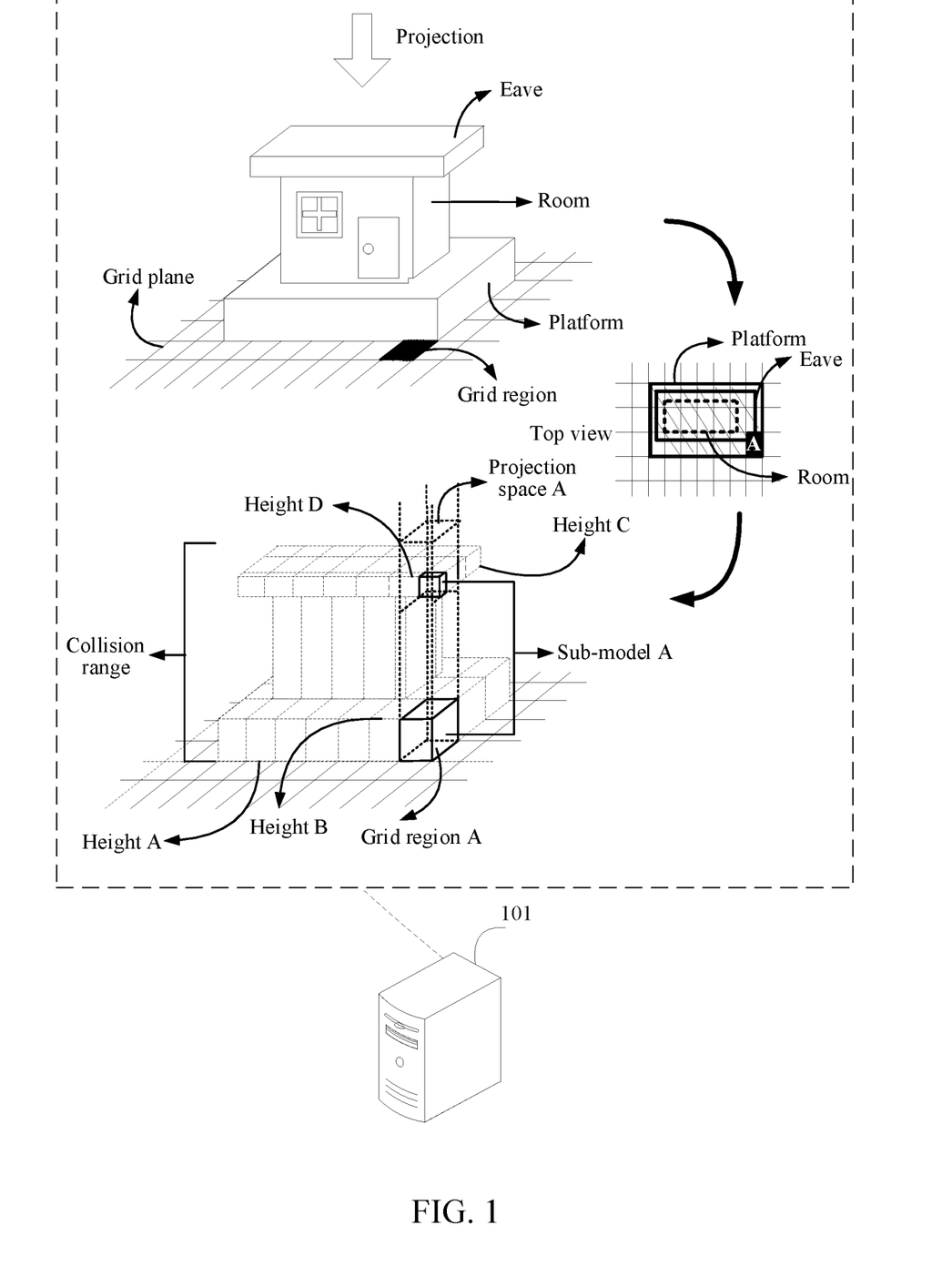
FIG. 1 is a schematic diagram of an application scene of a method for determining a collision range according to an embodiment of the present disclosure.

Referring to FIG. 1, FIG. 1 is a schematic diagram of an application scene of a method for determining a collision range according to an embodiment of the present disclosure. In the practical application scene, a processing device is a server 101. The server 101 is capable of determining a collision range for a three-dimensional house model shown in FIG. 1. The three-dimensional house model has three components: a platform, a room and an eave.

It is to be understood that a collision range of a three-dimensional model is a three-dimensional range. In order to be able to express the three-dimensional range while avoiding analyzing each patch of the three-dimensional model, in this practical application scene, the three-dimensional model is integrally analyzed, a plane (the plane may be referred to as a grid plane) and height information are determined according to the three-dimensional model, and then a collision range of the three-dimensional model may be obtained by combining the grid plane and the height information.

First, it is necessary to determine a grid plane corresponding to the three-dimensional model. As shown in FIG. 1, the server 101 may first determine a grid plane according to the three-dimensional house model. The grid plane may be located at the bottom of the three-dimensional model as shown in the figure or at other portions of the three-dimensional model. A plurality of grid regions are distributed on the grid plane, and the server 101 may convert the three-dimensional model into a two-dimensional image on the grid plane by projecting the three-dimensional model to the grid plane. The two-dimensional image may reflect projection situations of each portion of the three-dimensional model on the grid plane. As shown in FIG. 1, the three-dimensional house model can be converted into a top view on the grid plane by projection, and it can be seen from the top view that a portion of the three-dimensional model projected in grid region A is a portion of platform and eave.

After obtaining the grid plane, the server 101 also needs to determine height information of the three-dimensional model in each grid region in order to form a three-dimensional collision range. It is to be understood that since the server 101 projects the three-dimensional model towards the grid plane, the server 101 can obtain height information of the three-dimensional model with respect to the grid plane in the projection process.

Through the above steps, after the projection is completed, the server 101 can obtain a grid plane including grid regions containing height information. Height information corresponding to a grid region may identify the height of a portion of the three-dimensional model with respect to the grid plane. The portion of the model is referred to as a sub-model of the three-dimensional model. The sub-model refers to a portion of the three-dimensional model in a projection space of the grid region. The projection space of the grid region refers to a space region extending from the grid region in a direction perpendicular to the grid plane.

As shown in FIG. 1, a projection space corresponding to grid region A is projection space A. The projection space contains a portion of platform and eave of the three-dimensional house model. The portion of platform and eave forms sub-model A of the three-dimensional model in projection space A. When projecting the three-dimensional model, the server 101 can obtain height information corresponding to grid region A, which is respectively height A of a bottom surface, height B of the platform, height C of the bottom of the eave, and height D of the top of the eave. By combining grid region A and the height information, the server 101 may determine a collision range corresponding to the three-dimensional model in projection space A, i.e., a collision range corresponding to the portion of platform and eave.

By the same reasoning, the server 101 may determine a collision range corresponding to the sub-model of the three-dimensional model located in the projection space of each grid region according to each grid region and the height information corresponding thereto, and combine the collision ranges of all the sub-models to obtain a collision range corresponding to the three-dimensional house model.

It can be seen therefrom that when determining the collision range of the three-dimensional house model, the server 101 only needs to project the entire three-dimensional model to the grid plane without traversing each patch of the three-dimensional model, and may restore the collision range corresponding to each sub-model of the three-dimensional house model through the obtained height information of each grid region. The collision ranges of all the sub-models can be combined to obtain an entire collision range of the house model, thereby shortening the determination time of the collision range to a certain extent and improving the determination efficiency.

Next, a method for a collision range according to an embodiment of the present disclosure will be described with reference to the accompanying drawings.

Figure 2:
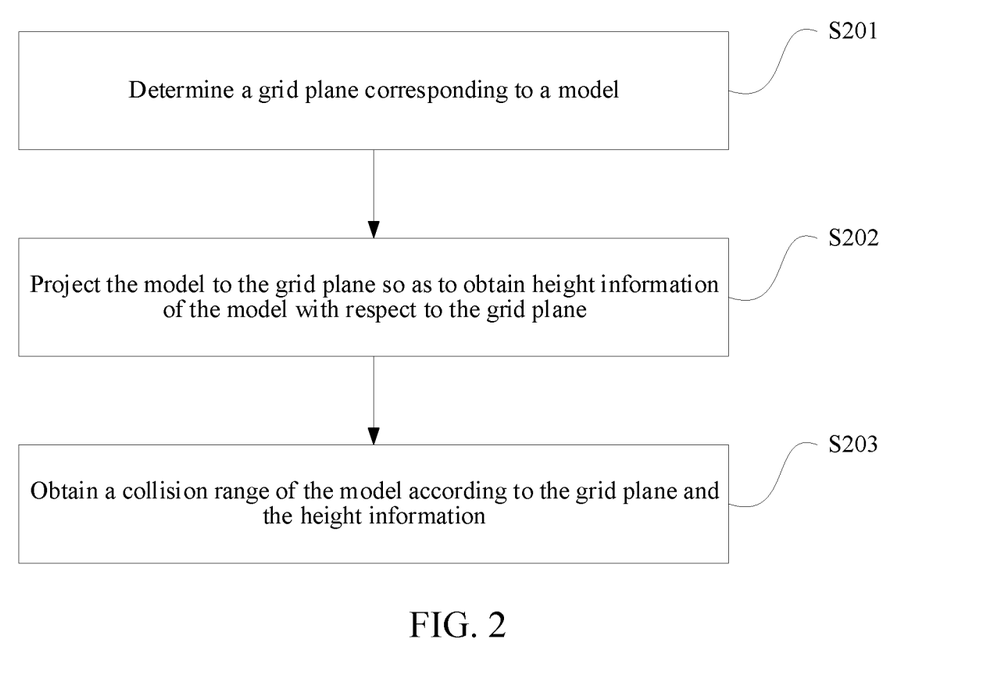
FIG. 2 is a flowchart of a method for determining a collision range according to an embodiment of the present disclosure.

Referring to FIG. 2, FIG. 2 shows a flowchart of a method for determining a collision range. The method includes the following steps:

S201: Determine a grid plane corresponding to a model.

With the popularity of a three-dimensional technology, how to make the three-dimensional model more real has become a hot issue for researchers. The capability of accurate simulation of a collision situation of a three-dimensional model is an important factor affecting the reality of the three-dimensional model. For example, when a three-dimensional game character controlled by a game player walks in a game map, three-dimensional buildings in various games may be encountered. At this moment, in order to make games more real, a game server may simulate a collision situation of the game character with the buildings according to a collision range of the game character and collision ranges of the buildings.

It can be seen therefrom that a collision range of the three-dimensional model is one of the important properties of the three-dimensional model, and the collision range refers to a volume range occupied by the three-dimensional model in space when the three-dimensional model collides. In the related art, a collision range of a three-dimensional model is generated based on patches constituting the three-dimensional model. A processing device needs to first cover each patch of the three-dimensional model with a three-dimensional grid, then determine positions of the patches according to a distance from each patch to the corresponding three-dimensional grid, and finally combine the positions of all the patches to obtain the collision range of the three-dimensional model. This method needs to traverse each patch of the three-dimensional model, and as the fineness of the three-dimensional model is higher, the number of patches possessed by a three-dimensional model also increases exponentially. Therefore, by using this method, the determination time for the collision range of the three-dimensional model will be longer, and the determination efficiency will be excessively low.

In order to avoid traversing each patch of the three-dimensional model, in the embodiments of the present disclosure, the three-dimensional model may be converted into a two-dimensional image of a certain plane by projecting the three-dimensional model into a two-dimensional plane, and height information of the three-dimensional model corresponding to each portion of the two-dimensional image is determined in the projection process. Finally, a collision range of the three-dimensional model in space is determined by combining the two-dimensional image and the height information obtained by the projection. Since the projection process projects the entire three-dimensional model, the time for traversing all the patches is omitted, only the portion of the three-dimensional model capable of generating height information in the two-dimensional image needs to be concerned, thereby shortening the time for determining a collision range to a certain extent.

In order to enable projection into a two-dimensional plane, the processing device first determines a projection direction. After obtaining a model, the processing device may determine a grid plane corresponding to the model. The grid plane is a two-dimensional plane corresponding to this projection, and a projection direction is a direction for projecting to the grid plane. It is to be understood that since the entire model is projected, and the two-dimensional plane and the height information obtained by the projection correspond to the projection direction, the determined collision range is the collision range of the model regardless of the direction from which the model is projected. Based on this, in the embodiments of the present disclosure, the position of the grid plane is not limited. In the embodiments of the present disclosure, the processing device may take a plane where the bottom surface of a model is located as a grid plane, and project the model toward the grid plane.

In order to make the grid plane accurately reflect the projection situation of each portion of the model, the processing device may divide a plurality of grid regions in the grid plane, and each grid region occupies a partial area of the grid plane. The projection situation of the entire model may be reflected by the combination of a plurality of grid regions included in the grid plane. For example, the grid region shown in FIG. 1 includes a grid region A, and the grid region A includes a partial eave-platform model in the house model is included. In another grid region, a partial room-platform model of the house model may also be included. By combining a plurality of grid regions, the projection situation of the entire three-dimensional house model on the grid plane may be reflected.

S202: Project the model to the grid plane so as to obtain height information of the model with respect to the grid plane.

In the process of projecting a model, in order to be able to determine a collision range based on a grid region on a grid plane, the processing device needs to acquire an information value capable of converting a two-dimensional plane into determination of a collision range in a three-dimensional space. It is to be understood that since the projection is performed in a direction perpendicular to the grid plane, the processing device can obtain height information of each face of the model intersecting the perpendicular direction with respect to the grid plane in the projection process.

The height information of the model includes height information corresponding to the plurality of grid regions. Since the projected portions of the model in different grid regions may be different, the height information corresponding to each grid region obtained by projection may also be different. The height information corresponding to a grid region may also be referred to as grid height information. The grid height information corresponding to the grid region is used for identifying the height of a sub-model (e.g., a sub-model may have one or more heights) in the model with respect to the grid plane, and the sub-model is a portion of the model in a projection space of the grid region. The projection space of the grid region refers to a space in which the grid region extends in a direction perpendicular to the grid plane on the basis of a region area contained therein, and the space passes through the grid region. In some embodiments, each sub-model has a one-to-one correspondence with one of the plurality of grid regions.

It is to be understood that the projection process of the model by the processing device may be regarded as a process of projecting all the sub-models included in the model to the corresponding grid region. Therefore, at the end of the projection, each grid region may include height information of a plane of the corresponding sub-model intersecting the projection direction.

As shown in FIG. 1, projection space A corresponding to grid region A is a space extending upwards from the grid region in a direction perpendicular to a grid plane. The space includes a portion of eave and platform of a three-dimensional house model. The portion of eave and platform is a sub-model of the three-dimensional house model. In the projection process, planes where this sub-model intersects with the projection direction are an upper surface of the eave, a lower surface of the eave, an upper surface of the platform, and a bottom surface, and therefore four pieces of height information may be included in the grid region.

It is to be understood that a plane in the model may include multiple directions, and when the plane is perpendicular to the projection direction, the processing device may directly obtain height information of the plane. When the plane is not perpendicular to the projection direction, since the grid region is often much smaller than the model, an average height of a portion of the grid region onto which the plane can be projected may be approximately regarded as grid height information corresponding to the grid region.

S203: Obtain a collision range of the model according to the grid plane and the height information.

After the projection has ended, the processing device may obtain a grid plane including grid regions having height information. The grid region may be understood as the "bottom" of the collision range, and the height information may be understood as the "height" of the collision range. By combining the bottom and the height, the processing device may determine a three-dimensional collision range according to a two-dimensional grid plane including height information.

According to the height information corresponding to each grid region on the grid plane, the processing device may determine the collision range corresponding to the sub-model in the projection space of the grid region, and the collision ranges of all the sub-models are combined to be the collision range of the model. As shown in FIG. 1, in grid region A, a collision range of a corresponding portion of the platform in the projection space of grid region A can be determined by height A and height B corresponding to grid region A, and a collision range of a portion of the eave can be determined by height C and height D. In the projection space of other grid regions, the collision range of other portions of the eave, the platform or the room may be determined, and the collision range of the entire three-dimensional house model may be obtained by combining the collision ranges of these sub-models.

It can be seen from the above-mentioned technical solution that a grid plane including a plurality of grid regions may be determined according to a model. The model is projected to the grid plane so as to obtain height information of the model with respect to the grid plane. That is to say, when a three-dimensional model is transformed to a two-dimensional model by projection, heights of portions of the model in a projection space of each grid region may be acquired in the projection process. A collision range of the model may be obtained according to the grid plane and the height information without traversing all components in the model, thereby reducing the impact of a complex model on determination of the collision range and improving the efficiency of determining the collision range.

It is to be understood that there may be multiple manners of projecting the model. In order to make range determination faster, the processing device may save the time of range determination from the perspective of dimension reduction by rendering the model into a two-dimensional image in the projection process. In one embodiment, the processing device may, by means of a virtual camera, take a photograph of the model at a top view angle with respect to the grid plane, so as to render a corresponding two-dimensional image of the model on the grid plane.

Figure 3:
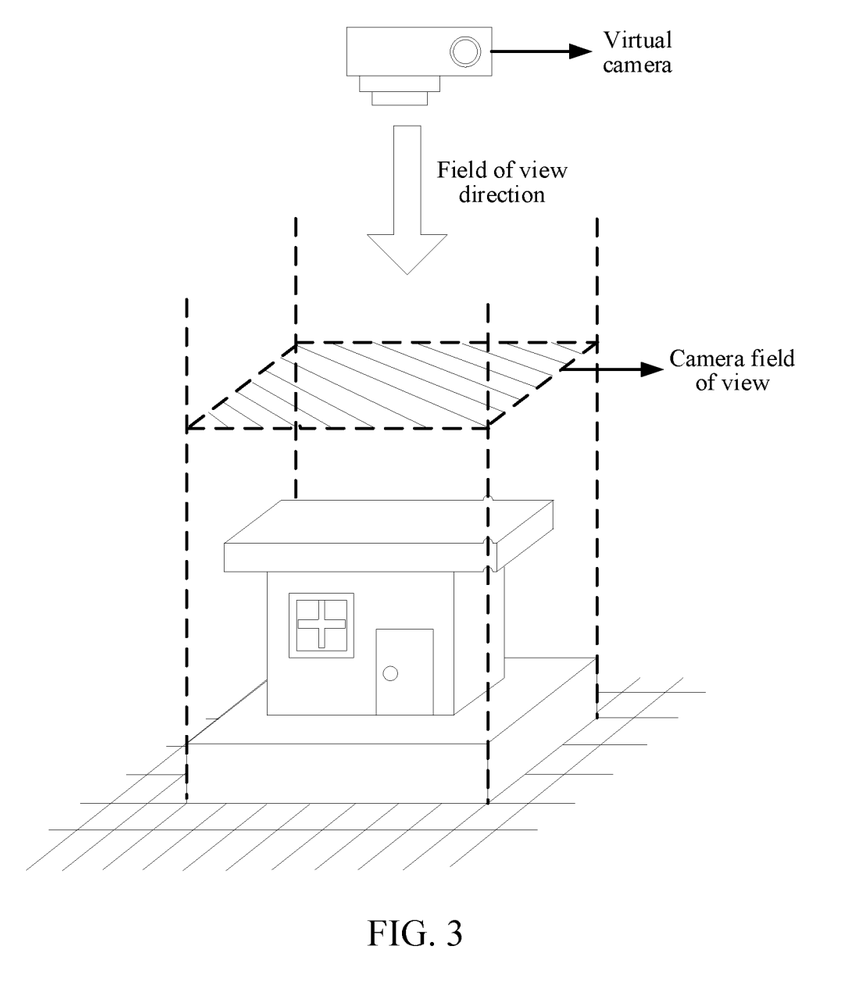
FIG. 3 is a schematic diagram of a method for determining a collision range according to an embodiment of the present disclosure.

First, the processing device ensures that the virtual camera can take a photograph of all the models-to-be-processed. The processing device may acquire a camera field of view including the model according to a virtual camera at a top view angle with respect to the grid plane. The camera field of view refers to a region range that needs to be converted when the virtual camera performs two-dimensional image conversion, and the camera field of view needs to cover the entire model. As shown in FIG. 3, the camera field of view in FIG. 3 can cover the entire three-dimensional house model at a top view angle. Subsequently, the processing device may perform image rendering on the camera field of view on the grid plane by using the virtual camera so as to obtain a two-dimensional model image carrying the height information. The two-dimensional model image is a projection of the model on the grid plane. As shown in FIG. 1, a two-dimensional image of a house model obtained at a top view angle is shown in FIG. 1. It is to be understood that the virtual camera is an orthogonal camera, i.e., when image rendering is performed on each portion of the model by the virtual camera, the field of view direction of the virtual camera is ensured to be perpendicular to the grid plane.

It is to be understood that during image rendering, it may occur that only part of the area of a grid region can be projected by the model. However, when determining a collision range, since it is determined according to a grid region and height information included, a collision range determined by the grid region may be greater than an actual collision range of a sub-model in a projection space of the grid region, i.e., there may be some errors in determining the collision range.

It is to be understood that since the collision range of the model is composed of collision ranges of sub-models and the sub-models are determined by the projection space of grid regions, as the proportion of the sub-models included in the projection space of each grid region to the entire model is smaller, i.e. the proportion of each grid region in a projected two-dimensional model image is smaller, the collision range of the model can be more accurately determined to a certain extent. A pixel is an inseparable component unit in the two-dimensional model image, and one pixel occupies a small grid in the two-dimensional model image. Therefore, if the size of the grid region is set as the size of the pixel in the two-dimensional model image, each projected grid region may be occupied by the two-dimensional model image as much as possible to a certain extent, thereby reducing the errors of the determined collision range.

Based on this, in order to refine the collision range determined by the processing device, in one embodiment, the processing device may determine the size of the grid region according to a sampling rate, so that one grid region corresponds to one pixel in the two-dimensional model image, i.e. rasterization of the two-dimensional model image is achieved. The sampling rate refers to the number of grid regions included in a unit region area of the grid plane. As the number of grid regions included in the same region area (e.g., unit region area) is larger, the sampling rate is higher. Rasterization refers to the process of converting an image into an image composed of grids, and one grid corresponds to one pixel in the image. In the embodiments of the present disclosure, a grid is a grid region. It is to be understood that there may be multiple manners of acquiring the height information of the model. In one embodiment, when a grid region corresponds to a pixel in the two-dimensional model image, the processing device may determine height information corresponding to the pixel in the two-dimensional model image from a pixel shader in the process of image rendering of the camera field of view. The pixel shader is a program executed on a graphics processing unit (GPU) of a physical card during the rasterization processing of each pixel, and the program can detect coordinates of each pixel in the space. By means of the program, the processing device can determine a coordinate value of each pixel in the projection space which can be projected to the two-dimensional model plane of the model in the projection process, and then can determine height information of the pixel corresponding to each grid region.

It is to be understood that since the shape of the model tends to have various convex and concave portions, different portions of the same model may be in different height layers. For example, in a house model shown in FIG. 1, an eave portion and a platform portion are in different layers. In order to determine the collision range of the model in more detail, the processing device may further analyze the height layers included in the various portions of the model.

The height layer of the eave portion is composed of height C of the bottom of the eave and height D of the top of the eave, and the height layer of the platform portion is composed of height A of the ground and height B of the platform. It can be seen therefrom that in order to determine the height layers included in the various portions of the model, the processing device may perform operations by determining the height of upper and lower surfaces of each height layer.

In one embodiment, the grid height information corresponding to the grid region obtained by the processing device includes a surface type identifier associated with each height included in the grid height information, the surface type identifier is either an upper surface identifier or a lower surface identifier. The upper surface identifier is used for identifying that the associated height corresponds to a position belonging to an upper surface in the sub-model, and the lower surface identifier is used for identifying that the associated height corresponds to a position belonging to a lower surface in the sub-model. The upper and lower surface properties of a patch are determined according to a relative orientation of the patch during the projection, and the relative orientation of the patch refers to an orientation of the patch with respect to the projection direction. For example, in FIG. 1, when the projection direction is a vertical projection from top to bottom, a patch of height D is an upper surface with respect to the projection direction and a patch of height C is a lower surface with respect to the projection direction.

After obtaining the surface type identifiers of the height layer, the processing device may perform height layer division on the grid height information according to the surface type identifiers by traversing the grid height information corresponding to the grid region. A height layer may be divided by height information having a lower surface identifier and height information having an upper surface identifier. In the sub-model, the portion occupied by the height layer is solid, and when the sub-model collides, if other three-dimensional models are in the height layer at a portion in contact with the sub-model, the three-dimensional model cannot pass through the sub-model. By traversing, the processing device may acquire the height layers contained in all the grid regions, and then obtain height layers included in the entire model by combination. Thus, the processing device may obtain the collision range of the model according to a height layer divided according to the grid region in the grid plane.

For example, in FIG. 1, height information C corresponding to grid region A may have a lower surface identifier and height information D may have an upper surface identifier. Based on the identifier, the server 101 can divide and obtain a height layer of the eave portion in the sub-model corresponding to grid region A. When another three-dimensional model, such as a three-dimensional character model, passes through the three-dimensional house model, the processing device may determine whether the height of the three-dimensional character model has a portion at the height layer of the eave, and if so, it is indicated that the three-dimensional character model collides with the eave.

It is to be understood that due to the different complexity of different models-to-be-processed, a plurality of height layers may be included in partially more complex models-to-be-processed. For example, as shown in FIG. 1, in a sub-model corresponding to grid region A, two height layers of platform and eave are included. There may be a case where the spacing between some height layers is excessively small, so that each portion of the three-dimensional model cannot pass through the spacing between the height layers when determining the collision situation between the model and other three-dimensional models. At this moment, for the three-dimensional model, the spacing between the height layers may be regarded as not existing, i.e., two height layers may actually be regarded as one height layer, which includes both the height of the original two height layers and the height of an intermediate spacing. The height layer obtained by this combination and the original two height layers actually show the same collision range of the model in the determination of the collision situation.

Therefore, in order to further simplify the collision range of the model and improve the efficiency of determining the collision range, in one embodiment, the processing device may perform height layer division to obtain one or more undetermined height layers according to the associated surface type identifier(s) by traversing the grid height information corresponding to the grid region. The undetermined height layers refer to the own/original height layers of the model. Subsequently, the processing device may determine a spacing between adjacent undetermined height layers, combine adjacent undetermined height layers having a spacing less than a threshold into one height layer, and determine adjacent height layers having a spacing greater than or equal to the threshold as different height layers. The threshold may be the height of a minimum height portion that is likely to collide with the model when determining the collision situation of the model.

Figure 4:
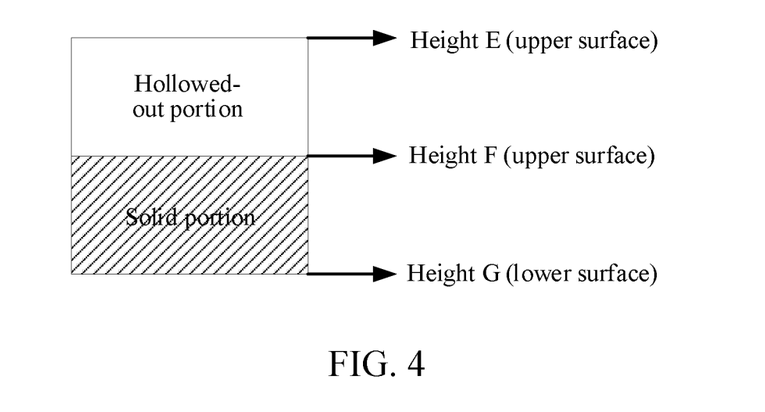
FIG. 4 is a side view of a three-dimensional model of a cube according to an embodiment of the present disclosure.

It is to be understood that the number of lower surface identifiers and upper surface identifiers in the height information included in the grid region may not be the same. For example, as shown in FIG. 4, FIG. 4 is a side view of a three-dimensional model of a cube. A portion of the interior of the cube has been hollowed-out, and the hollowed-out portion is enclosed by the sides of the cube and thus still falls within a collision range of the cube. Therefore, during the projection, three pieces of height information, i.e., height E, height F and height G, may be included in the grid region.

Height E and height F both belong to an upper surface, and thus have upper surface identifiers. Height G belongs to a lower surface and thus has a lower surface identifier.

When determining the collision range, the processing device may combine the separate height information having the upper/lower surface identifier with the adjacent height layer, so that the collision range of the model can be determined more reasonably. In FIG. 4, since height F and height G can form one height layer and height E is a separate upper surface height layer, the processing device may combine heights E, F and G into the same height layer, an upper surface height of the height layer is height E, and a lower surface height of the height layer is height G.

Figure 5:
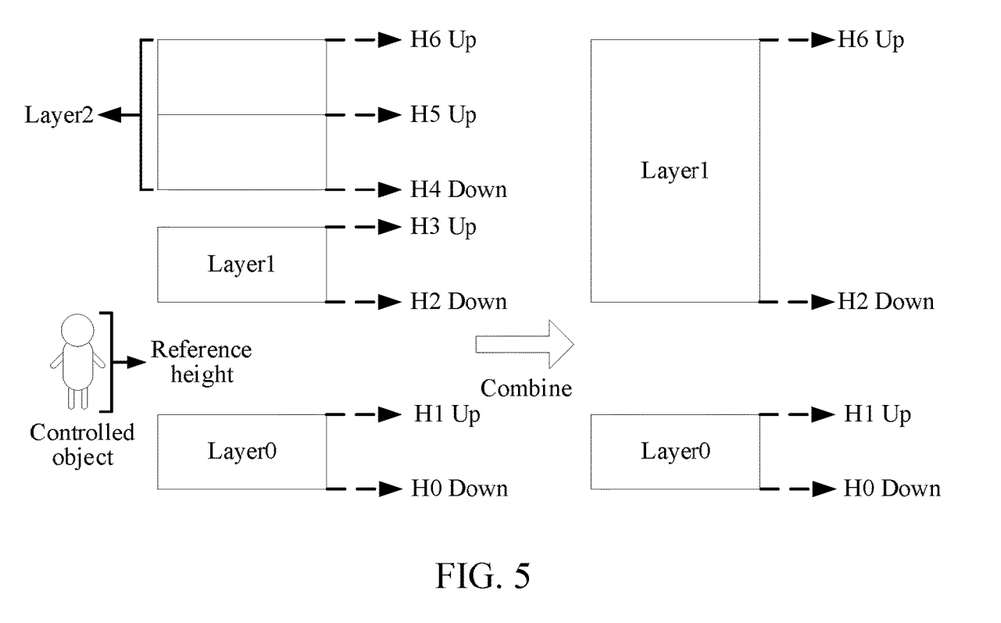
FIG. 5 is a schematic diagram of a method for determining a collision range according to an embodiment of the present disclosure.

It is to be understood that the manners of determining the threshold may also be different in different collision scenes. In one embodiment, when a collision scene is a model collision within a game, in order to make the game experience of a game player more real, the processing device may determine a threshold according to the size of a controlled object in the game corresponding to the model, starting from simulating the collision reality of the object controlled by the game player. For example, as shown in FIG. 5, after the projection has ended, the processing device may obtain seven pieces of height information H0-H6 in a certain grid region. H0-H6 each have a surface identifier of "Up" or "Down", "Up" indicating that the height information has an upper surface identifier, and "Down" indicating that the height information has a lower surface identifier.

After the height information is determined, the processing device may first sort the height information according to a high-low order, and then traverse all the height information from bottom to top to form three height layers: Layer0-Layer2. As a separate upper surface, H6 forms a height layer formed together with H5 and H4. In this figure, the controlled object is a small game character controlled by a player, the height of the small game character from head to foot is a reference height, and the processing device may set the reference height as a threshold.

As can be seen from the figure, the spacing between Layer0 and Layer1 is greater than the threshold, while the spacing between Layer1 and Layer2 is less than the threshold. Therefore, the small game character can only pass between Layer0 and Layer1, and cannot pass between Layer1 and Layer3. It can be seen therefrom that Layer1 and Layer2 are equivalent to one layer for the small game character. Therefore, the processing device may combine the height layers, resulting in two height layers: Layer1 and Layer2 as shown in the figure.

It is to be understood that there may be multiple manners of determining the collision range according to the height layers. In one embodiment, since the processing device has obtained the height layer included in each grid region in the above process, the area of the grid region may be regarded as the "bottom" of a columnar structure, while the height layer may be regarded as the "height" of a columnar structure. By combining "bottom" and "height", a columnar structure is may be determined. Based on this, the processing device may generate a columnar structure conforming to the height layer based on the grid region according to the one or more height layers obtained from the height layer division. The columnar structure can reflect the collision range of a sub-model corresponding to the grid region, and the collision ranges of all the sub-models can be combined to form the collision range of the model. Therefore, the processing device may obtain a collision range of the model according to the columnar structure.

For example, in FIG. 1, the server 101 can generate a columnar structure of grid region A according to a height layer corresponding to the grid region. The columnar structure includes a portion of eave and platform. In columnar structures of other grid regions, a portion of room, eave or platform may be included. The server 101 may combine all the columnar structures to obtain a collision range of a completed three-dimensional house model.

In addition, it is to be understood that in the model, it is less likely to involve collision of a portion of the model. For example, when the model is a building model, an advertising signboard may be hung on the outside of the highest floor of the building, while other three-dimensional models, such as a vehicle model or a character model, hardly reach the height of the signboard and collide with the signboard. Therefore, when determining the collision range of a building, the processing device may directly discard the signboard without taking into account the collision range of the building, thereby further improving the determination efficiency of the collision range on the premise of ensuring the validity of the collision range.

Therefore, in one embodiment, the processing device may filter the height information of the model with respect to the grid plane through the height range and retain the height information of an identified height within the height range before determining the collision range of the model according to the grid plane and the height information. The height range is determined according to possible collisions generated by the model. By this filtering manner, the processing device may discard unnecessary height information so that an effective collision range can be determined by using less height information.

It is to be understood that the collision range in the embodiments of the present disclosure is composed of collision ranges of sub-models in a grid region, and the collision ranges of the sub-models are determined by the grid region and the height information possessed thereby. Therefore, the processing device may independently generate the collision range of the sub-model corresponding thereto according to each grid region, without being interfered by other grid regions. It can be seen therefrom that information processing in different grid regions may be performed in parallel.

The GPU is composed of a large number of computing units and an ultra-long pipeline, and is suitable for processing a large number of unified types of data. The GPU is adept at graph-like or non-graph-like highly parallel numerical computations, and may accommodate thousands of non-logically related numerical computation threads. The advantage of the GPU is the parallel computation of non-logically related data, so it is just suitable to perform the parallel information processing of each grid region in the method for determining a collision range provided by the embodiments of the present disclosure. Therefore, in order to further improve the determination efficiency of the collision range, in one embodiment, the method for determining a collision range may be performed by the GPU in the processing device.

However, in the related art, the traversal of a three-dimensional model patch is realized through serial processing by a central processing unit (CPU). Therefore, when a model is relatively complex and the number of patches is relatively large, it takes a lot of time to determine the collision range. Through the unique parallel processing characteristics of the method provided by the present disclosure, in combination with a parallel processing function of the GPU, the efficiency gap with the related art can be further widened.

Figure 6:
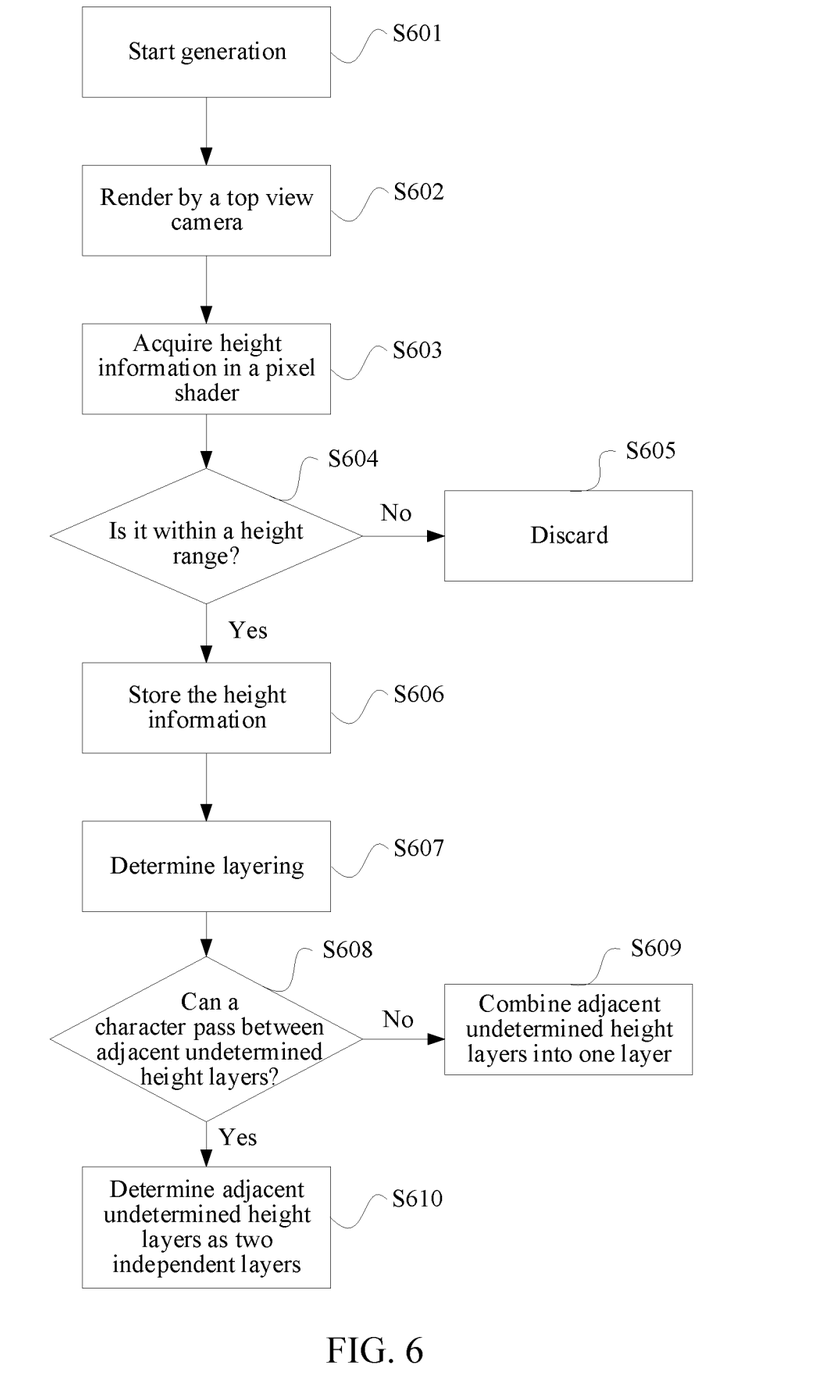
FIG. 6 is a flowchart of a method for determining a collision range in a practical application scene according to an embodiment of the present disclosure.

Next, the method for determining a collision range provided by the embodiments of the present disclosure will be described in conjunction with a practical application scene. Referring to FIG. 6, FIG. 6 is a schematic diagram of a method for determining a collision range in a practical application scene. In this practical application scene, the processing device is a server including a GPU, and the model is a building model in a game.

S601: Start generation.

After acquiring a model, the server starts to generate a collision range of the model.

S602: Perform rendering by a top view camera.

The server may render the to-be-processed model from a top view direction through a virtual camera to obtain a corresponding two-dimensional model image. First, the server may determine a sampling rate of the virtual camera according to the size of the model, and determine the size of a grid region according to the sampling rate. In this practical application scene, the size of the model is 20*20 m at a top view angle, and the server may set the grid region to 0.5 m, thereby creating a grid plane including 40*40 grid regions. The size of the grid region is the same as a pixel size of the finally generated two-dimensional model image.

S603: Acquire height information in a pixel shader.

In the process of rendering the two-dimensional model image with the virtual camera at a top view angle, the server may acquire height information of a sub-model corresponding to each grid region through the pixel shader.

S604: Determine whether it is within a height range.

The server may filter the acquired height information, discard the height information which is not within the height range through S605, and if it is within the height range, S606 is performed to store the height information.

It is to be understood that in order for a GPU to be able to determine a collision range in a parallel manner, the server needs to ensure that each grid region has relevant data needed to establish the collision range. Based on this, the server may record and save its corresponding height information and surface identifiers in the height information through an atomic operation, i.e., an independent operation for each grid region. The server may store height information of each grid region (i.e., each pixel) index through a height array HeightArray, and store the number of heights of corresponding grid regions (pixels) by using a count array CountArray. When the server obtains height information height of a certain grid region, the server adds 1 to the number of recorded heights of this grid region through the atomic operation, and the array is as follows:

InterlockedADD(CountArray [index], 1, originalCount)

Subsequently, the server may determine to which position of the height array the obtained height information needs to be written according to this grid region index and the height number originalCount accumulated in this grid region index, and the array is as follows:

HeightArray[index+originalCount]=height

S607: Determine layering.

By means of the position determination, the server may sort the height information included in the grid region index so that a layering relationship corresponding to the grid region can be calculated. Determining layering means dividing according to height information to obtain a plurality of undetermined height layers.

S608: Determine whether a character can pass between adjacent undetermined height layers.

After determining undetermined height layers, the server may determine, according to the size of a game character controlled by a player, whether the character can pass between adjacent undetermined height layers, and if so, S610 is performed to determine adjacent undetermined height layers as two independent layers. If no, S609 is performed to combine adjacent undetermined height layers into one layer, thereby completing the height layer division.

Through the height layer determined by each grid region, the server can determine a columnar structure corresponding to each grid region, and the columnar structure can reflect a collision range of a sub-model corresponding to the grid region. Finally, a collision range of the entire model may be obtained by combining the collision ranges of each sub-model.

Figure 7:
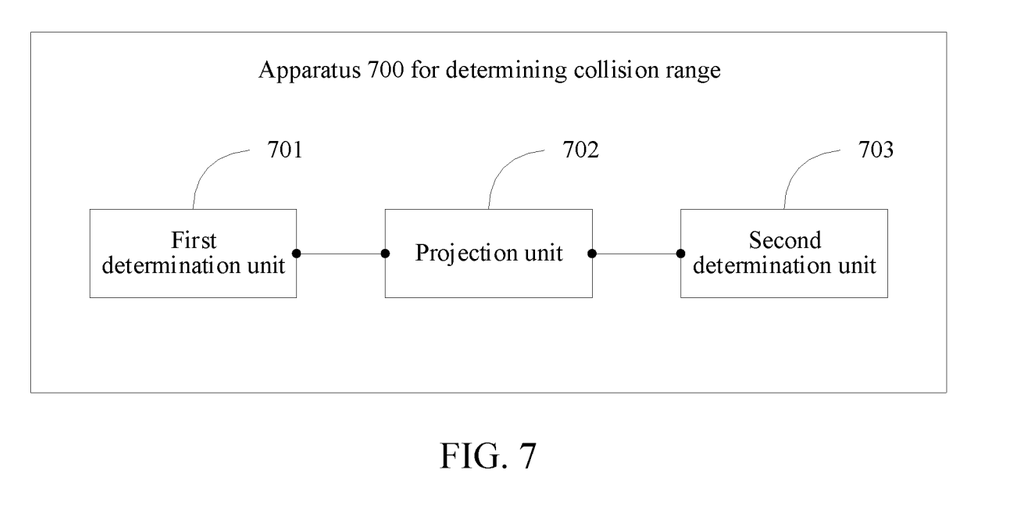
FIG. 7 is a structural block diagram of an apparatus for determining a collision range according to an embodiment of the present disclosure.

Based on the method for determining a collision range provided by the above embodiments, embodiments of the present disclosure also provide an apparatus 700 for determining a collision range. The apparatus 700 is deployed on a processing device having a model analysis function. Referring to FIG. 7, FIG. 7 is a structural block diagram of an apparatus for determining a collision range according to an embodiment of the present disclosure. The device 700 includes a first determination unit 701, a projection unit 702 and a second determination unit 703.

The first determination unit 701 is configured to determine a grid plane corresponding to a model. The grid plane includes a plurality of grid regions.

The projection unit 702 is configured to project the model to the grid plane so as to obtain height information of the model with respect to the grid plane. The grid height information corresponding to the grid region is used for identifying the height of a sub-model in the model with respect to the grid plane, and the sub-model is a portion of the model in a projection space of the grid region.

The second determination unit 703 is configured to obtain a collision range of the model according to the grid plane and the height information.

In one embodiment, the projection unit 702 is specifically configured to:

acquire a camera field of view including the model according to a virtual camera at a top view angle with respect to the grid plane; and perform image rendering on the camera field of view on the grid plane so as to obtain a two-dimensional model image carrying the height information.

In one embodiment, the size of the grid regions is determined according to a sampling rate such that one of the grid regions corresponds to one pixel in the two-dimensional model image.

In one embodiment, the projection unit 702 is specifically configured to:

determine height information corresponding to pixels in the two-dimensional model image according to a pixel shader during the process of image rendering on the camera field of view.

In one embodiment, the grid height information corresponding to the grid region includes a surface type identifier associated with each height included in the grid height information, the surface type identifier is either an upper surface identifier or a lower surface identifier. The upper surface identifier is used for identifying that the associated height a position belonging to an upper surface in the sub-model, and the lower surface identifier is used for identifying that the associated height corresponds to a position belonging to a lower surface in the sub-model.

The second determination unit 703 is specifically configured to:

perform height layer division on the height information according to the surface type identifiers by traversing the grid height information corresponding to the grid region; and obtain a collision range of the model according to a one or more height layers obtained from the height layer division.

In one embodiment, the second determination unit 703 is specifically configured to:

perform height layer division on the grid height information to obtain one or more undetermined height layers according to the surface type identifiers by traversing the grid height information corresponding to the grid region;

determine a spacing between adjacent undetermined height layers;

combine adjacent undetermined height layers having a spacing less than a threshold into one height layer; and determine adjacent undetermined height layers having a spacing greater than or equal to the threshold as different height layers.

In one embodiment, the threshold is determined according to the size of a controlled object in a game corresponding to the model.

In one embodiment, the second determination unit 703 is specifically configured to:

generate a columnar structure conforming to the height layer based on the grid region according to the one or more height layers obtained from the height layer division; and obtain a collision range of the model according to the columnar structure.

In one embodiment, the apparatus 700 further includes a filtering unit.

The filtering unit is configured to filter the height information through a height range, and retain height information of an identified height within the height range.

In one embodiment, the apparatus 700 is deployed on a processing device including a GPU.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
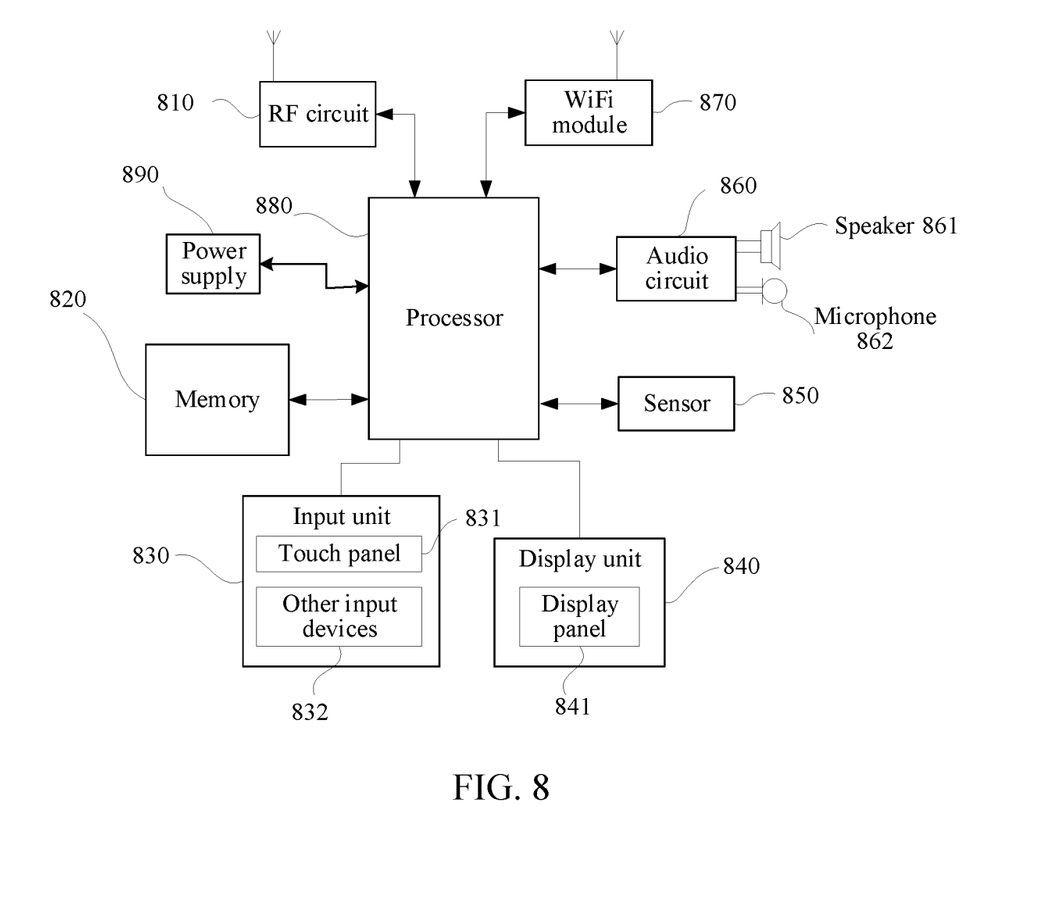
FIG. 8 is a structural diagram of a device for determining a collision range according to an embodiment of the present disclosure.

Embodiments of the present disclosure also provide a device for determining a collision range. The device is described below with reference to the accompanying drawings. Referring to FIG. 8, embodiments of the present disclosure provide a device for determining a collision range. The device may also be a terminal device. The terminal device may be any intelligent terminal including a mobile phone, a tablet computer, a PDA, and a computer. For example, the terminal device is a mobile phone.

FIG. 8 shows a block diagram of a partial structure of a mobile phone related to a terminal device provided by an embodiment of the present disclosure. With reference to FIG. 8, the mobile phone includes: a radio frequency (RF) circuit 810, a memory 820, an input unit 830, a display unit 840, a sensor 850, an audio circuit 860, a wireless fidelity (WiFi) module 870, a processor 880, a power supply 890, and other components. It is to be understood by those skilled in the art that the mobile phone structure shown in FIG. 8 is not limiting of the mobile phone, and the mobile phone may include more or fewer components than shown, or combine some components, or arrange different components.

The various component parts of the mobile phone are specifically described below with reference to FIG. 8.

The RF circuit 810 may be configured to receive and send a signal in the process of information receiving and sending or calling, and in particular, provide downlink information of a base station to a processor 880 for processing after receiving the downlink information. In addition, uplink data is sent to the base station. In general, the RF circuit 810 includes, but is not limited to, an antenna, at least one amplifier, a transceiver, a coupler, a low noise amplifier (LNA), a duplexer, etc. In addition, the RF circuit 810 may also communicate with networks and other devices via wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 820 may be configured to store a software program and a module, and the processor 880 executes various function applications and data processing of the mobile phone by running the software program and the module stored in the memory 820. The memory 820 may mainly include a storage program region and a storage data region. The storage program region may store an operating system, an application program required for at least one function (such as a sound playing function and an image playing function). The storage data region may store data (such as audio data and phone books) created according to the use of the mobile phone. In addition, the memory 820 may include a high-speed random access memory, and may also include a non-volatile memory such as at least one disk storage device, a flash device, or other non-volatile solid storage devices.

The input unit 830 may be configured to receive input digital or character information and generate a key signal input related to user settings and function control of the mobile phone. Specifically, the input unit 830 may include a touch panel 831 and other input devices 832. The touch panel 831, also referred to as a touch screen, may collect touch operations of a user thereon or nearby (such as an operation of the user on the touch panel 831 or nearby the touch panel 831 by using any suitable objects or attachments such as a finger or a stylus), and drive a corresponding connecting apparatus according to a preset program. In some embodiments, the touch panel 831 may include a touch detection apparatus and a touch controller. The touch detection apparatus detects the touch orientation of the user, detects a signal brought by the touch operation, and transmits the signal to the touch controller. The touch controller receives touch information from the touch detection apparatus, converts it to touch coordinates, transmits the touch coordinates to the processor 880, and can receive a command sent by the processor 880 and execute the command. In addition, the touch panel 831 may be implemented in various types such as a resistive type, a capacitive type, an infrared ray, and a surface acoustic wave. In addition to the touch panel 831, the input unit 830 may also include other input devices 832. Specifically, the other input devices 832 may include, but are not limited to, one or more of a physical keyboard, function keys (such as volume control keys and switch keys), a trackball, a mouse, a joystick, etc.

The display unit 840 may be configured to display information input by the user or information provided to the user and various menus of the mobile phone. The display unit 840 may include a display panel 841. In some embodiments, the display panel 841 may be configured in the form of a liquid crystal display (LCD), an organic light-emitting diode (OLED), etc. Further, the touch panel 831 may cover the display panel 841, when the touch panel 831 detects the touch operation thereon or nearby, the touch operation is transmitted to the processor 880 to determine the type of a touch event, and then the processor 880 provides a corresponding visual output on the display panel 841 according to the type of the touch event. Although the touch panel 831 and the display panel 841 implement input and input functions of the mobile phone by serving as two independent components in FIG. 8, the touch panel 831 and the display panel 841 may be integrated to implement the input and output functions of the mobile phone in some embodiments.

The mobile phone may also include at least one sensor 850, such as a light sensor, a motion sensor and other sensors. Specifically, the light sensor may include an ambient light sensor and a proximity sensor. The ambient light sensor may adjust the brightness of the display panel 841 according to the brightness of ambient light. The proximity sensor may turn off the display panel 841 and/or backlight when the mobile phone moves to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 860, a speaker 861 and a microphone 862 may provide an audio interface between the user and the mobile phone. The audio circuit 860 may transmit an electrical signal converted from the received audio data to the speaker 861, and the speaker 861 converts the electrical signal into a sound signal for output. Besides, the microphone 862 converts the collected sound signal into an electrical signal, the audio circuit 860 converts the received electrical signal into audio data and then outputs the audio data to the processor 880 for processing, the audio data is transmitted to, for example, another mobile phone via the RF circuit 810, or the audio data is output to the memory 820 for further processing.

WiFi belongs to a short-range wireless transmission technology, the mobile phone may assist the user in E-mail receiving and sending, webpage browsing, access to streaming media and the like by means of the WiFi module 870, and it provides a wireless wideband internet access for the user. Although FIG. 8 shows the WiFi module 870, it is to be understood that the WiFi module does not belong to necessary components of the mobile phone and may be omitted completely as required within the scope of not changing the essence of the present disclosure.

The processor 880 is a control center of the mobile phone, and connects all parts of the entire mobile phone by utilizing various interfaces and lines. By running or executing the application program and/or module stored in the memory 820 and calling data stored in the memory 820, various functions and processing data of the mobile phone are executed, so as to wholly monitor the mobile phone. In some embodiments, the processor 880 may include one or more processing units. Preferably, the processor 880 may be integrated with an application processor and a modulation-demodulation processor. The application processor mainly processes an operating system, a user interface, an application program, etc., and the modulation-demodulation processor mainly processes wireless communication. It is to be understood that the modulation-demodulation processor may not be integrated into the processor 880.

The mobile phone also includes a power supply 890 (such as a battery) that supplies power to various components. Preferably, the power supply may be connected to the processor 880 logically via a power supply management system, so as to implement functions of charging, discharging and power consumption management by means of the power supply management system.

Although not shown in the figure, the mobile phone may further include a camera, a Bluetooth module, and the like. Details are not described herein again.

In the present embodiment, the processor 880 included in the terminal device also has the following functions:

determining a grid plane corresponding to a model, the grid plane including a plurality of grid regions;

projecting the model to the grid plane so as to obtain height information of the model with respect to the grid plane, wherein the grid height information corresponding to the grid region is used for identifying the height of a sub-model in the model, and the sub-model is a portion of the model in a projection space of the grid region; and obtaining a collision range of the model according to the grid plane and the height information.

Figure 9:
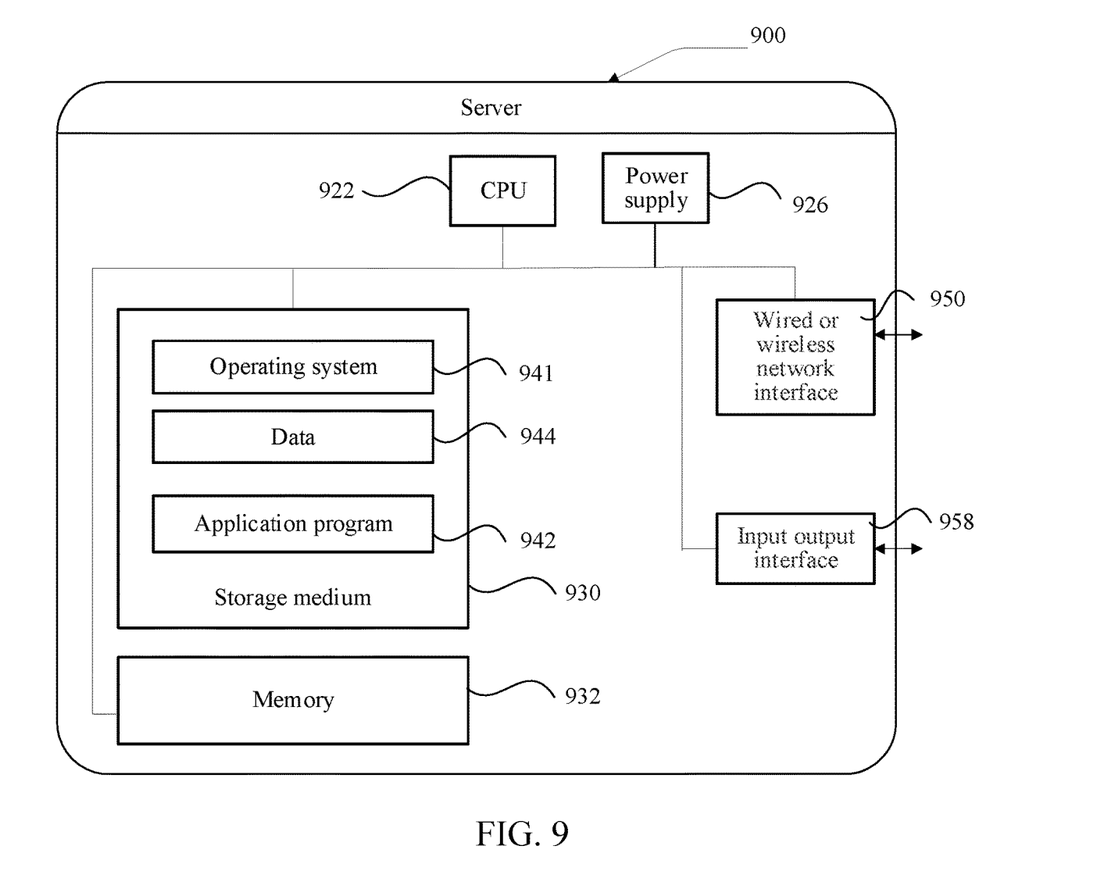
FIG. 9 is a structural diagram of a server according to an embodiment of the present disclosure.

Embodiments of the present disclosure also provide a server. Referring to FIG. 9, FIG. 9 is a structural diagram of a server 900 provided by an embodiment of the present disclosure. The server 900 may vary widely due to different configurations or performances, and may include one or more CPUs 922 (e.g., one or more processors), a memory 932, and one or more storage media 930 (e.g., one or more mass storage devices) for storing application programs 942 or data 944. The memory 932 and the storage medium 930 may be a transient memory or a persistent memory. A program stored in the storage medium 930 may include one or more modules (not shown), and each module may include a series of instruction operations for the server. Still further, the CPU 922 may be configured to communicate with the storage medium 930 to execute a series of instruction operations in the storage medium 930 on the server 900.

The server 900 may also include one or more power supplies 926, one or more wired or wireless network interfaces 950, one or more input/output interfaces 958, and/or, one or more operating systems 941 such as Windows Server™, Mac OS X™, Unix™, Linux™, and FreeBSD™.

The steps performed by the server in the above embodiments may be based on a server structure shown in FIG. 9.

Embodiments of the present disclosure also provide a computer-readable storage medium for storing a computer program for executing any one of the implementations of the method for determining a collision range described in the various preceding embodiments.

Those of ordinary skill in the art may understand that all or part of the steps implementing the above method embodiments may be completed through related hardware instructed by a program, the foregoing program may be stored in a computer-readable storage medium, and when the program is executed, the steps including the above method embodiments are performed. The foregoing storage medium may be at least one of the following media: various media capable of storing program codes such as a read-only memory (ROM), a RAM, a magnetic disk, or an optical disc.

The embodiments of this specification are all described in a progressive manner, for same or similar parts in the embodiments, refer to such embodiments, and descriptions of each embodiment focus on a difference from other embodiments. Especially, device and system embodiments are basically similar to the method embodiments, and therefore is described briefly; for related parts, reference may be made to partial descriptions in the method embodiments. The described device and system embodiments are merely exemplary. The units described as separate parts may or may not be physically separated, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments without creative efforts.

The foregoing descriptions are merely a specific implementation of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a collision range, performed by a computer device, the method comprising:
   determining a grid plane corresponding to a model, the grid plane comprising a plurality of grid regions;
   projecting the model to the grid plane and obtaining height information of the model with respect to the grid plane, the height information of the model including grid height information corresponding to a grid region that identifies a height of a sub-model in the model with respect to the grid plane, and the sub-model being a portion of the model in a projection space of the grid region; and
   obtaining a collision range of the model according to the grid plane and the height information of the model.

2. The method according to claim 1, wherein the projecting the model to the grid plane and obtaining height information of the model with respect to the grid plane comprises:
   acquiring a camera field of view comprising the model according to a virtual camera at a top view angle with respect to the grid plane; and
   performing image rendering on the camera field of view on the grid plane and obtaining a two-dimensional model image carrying the height information.

3. The method according to claim 2, wherein a size of the grid region is determined according to a sampling rate and one of the grid regions corresponds to one pixel in the two-dimensional model image.

4. The method according to claim 2, wherein the performing image rendering on the camera field of view on the grid plane and obtaining a two-dimensional model image carrying the height information comprises:
   determining height information corresponding to pixels in the two-dimensional model image according to a pixel shader during a process of the image rendering on the camera field of view.

5. The method according to claim 1, wherein the grid height information corresponding to the grid region comprises a surface type identifier associated with each height included in the grid height information, the surface type identifier is either an upper surface identifier or a lower surface identifier, the upper surface identifier indicates that the associated height corresponds to a position belonging to an upper surface in the sub-model, and the lower surface identifier indicates that the associated height corresponds to a position belonging to a lower surface in the sub-model;
   the obtaining a collision range of the model according to the grid plane and the height information comprises:
   performing height layer division according to the surface type identifiers by traversing the grid height information corresponding to the grid region; and
   obtaining a collision range of the model according to a one or more height layers obtained from the height layer division.

6. The method according to claim 5, wherein the performing height layer division according to the surface type identifiers by traversing the grid height information corresponding to the grid region comprises:
   dividing the grid height information corresponding to the grid region into a plurality of undetermined height layers according to the surface type identifiers;
   determining a spacing between adjacent undetermined height layers;
   combining adjacent undetermined height layers having a spacing less than a threshold into one height layer; and
   determining adjacent undetermined height layers having a spacing greater than or equal to the threshold as different height layers.

7. The method according to claim 6, wherein the threshold is determined according to a size of a controlled object in a game corresponding to the model.

8. The method according to claim 5, wherein the obtaining a collision range of the model according to a one or more height layers obtained from the height layer division comprises:
   generating a columnar structure conforming to the one or more height layers based on the grid region; and
   obtaining the collision range of the model according to the columnar structures of the grid regions.

9. The method according to claim 1, wherein before the obtaining a collision range of the model according to the grid plane and the height information, the method further comprises:
   filtering the height information through a height range, and retaining height information of an identified height within the height range.

10. The method according to claim 1, wherein the method is performed by a graphics processing unit (GPU) of the computer device.

11. An apparatus for determining a collision range, deployed on a processing device having a memory and a processor coupled to the memory, the processor being configured to:
    determine a grid plane corresponding to a model, the grid plane comprising a plurality of grid regions;
    project the model to the grid plane and obtain height information of the model with respect to the grid plane, the height information of the model including grid height information corresponding to a grid region that identifies a height of a sub-model in the model with respect to the grid plane, and the sub-model being a portion of the model in a projection space of the grid region; and obtain a collision range of the model according to the grid plane and the height information.

12. The apparatus according to claim 11, wherein the processor is further configured to:

acquire a camera field of view comprising the model according to a virtual camera at a top view angle with respect to the grid plane; and perform image rendering on the camera field of view on the grid plane so as to obtain a two-dimensional model image carrying the height information.

13. The apparatus according to claim 12, wherein a size of the grid region is determined according to a sampling rate and one of the grid regions corresponds to one pixel in the two-dimensional model image.

14. The apparatus according to claim 12, wherein the processor is further configured to:

determine height information corresponding to pixels in the two-dimensional model image according to a pixel shader during a process of the image rendering on the camera field of view.

15. The apparatus according to claim 11, wherein the grid height information corresponding to the grid region comprises a surface type identifier for each height included in the grid height information, the surface type identifier is either an upper surface identifier or a lower surface identifier, the upper surface identifier indicates that the associated height corresponds to a position belonging to an upper surface in the sub-model, and the lower surface identifier indicates that the associated height corresponds to a position belonging to a lower surface in the sub-model;

the processor is further configured to:

perform height layer division according to the surface type identifiers by traversing the grid height information corresponding to the grid region; and obtain a collision range of the model according to a one or more height layers obtained from the height layer division.

16. The apparatus according to claim 15, wherein the processor is further configured to: for one grid region, divide the grid height information corresponding to the grid region into a plurality of undetermined height layers according to the surface type identifiers;

determine a spacing between adjacent undetermined height layers;

combine adjacent undetermined height layers when the adjacent undetermined height layers have a spacing less than a threshold into one height layer; and determine adjacent undetermined height layers as different height layers when the adjacent undetermined height layers have a spacing greater than or equal to the threshold.

17. The apparatus according to claim 16, wherein the threshold is determined according to a size of a controlled object in a game corresponding to the model.

18. The apparatus according to claim 15, wherein the processor is further configured to:

generate a columnar structure conforming to the one or more height layers based on the grid region; and obtain the collision range of the model according to the columnar structures of the grid regions.

19. The apparatus according to claim 11, wherein before obtaining the collision range of the model according to the grid plane and the height information, the processor is further configured to:

filter the height information through a height range, and retaining height information of an identified height within the height range.

20. A non-transitory computer-readable storage medium storing a computer program that, when executed by a processor, cause the processor to perform:

determining a grid plane corresponding to a model, the grid plane comprising a plurality of grid regions;

projecting the model to the grid plane and obtaining height information of the model with respect to the grid plane, the height information of the model including grid height information corresponding to a grid region that identifies a height of a sub-model in the model with respect to the grid plane, and the sub-model being a portion of the model in a projection space of the grid region; and obtaining a collision range of the model according to the grid plane and the height information of the model.

* * * * *